(12) United States Patent
Monroe

(10) Patent No.: US 9,077,393 B2
(45) Date of Patent: Jul. 7, 2015

(54) APPARATUS AND METHOD FOR A MULTI-BAND RADIO OPERATING IN A WIRELESS NETWORK

(75) Inventor: Robert W. Monroe, Melissa, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 289 days.

(21) Appl. No.: 13/216,910

(22) Filed: Aug. 24, 2011

(65) Prior Publication Data
US 2012/0052822 A1 Mar. 1, 2012

Related U.S. Application Data

(60) Provisional application No. 61/378,347, filed on Aug. 30, 2010.

(51) Int. Cl.
H04B 1/18 (2006.01)
H04B 1/00 (2006.01)

(52) U.S. Cl.
CPC .................... *H04B 1/0071* (2013.01)

(58) Field of Classification Search
CPC ............................... H04W 88/08; H04B 1/007
USPC ...................................................... 455/168.1
See application file for complete search history.

(56) References Cited

U.S. PATENT DOCUMENTS

| | | | |
|---|---|---|---|
| 6,804,261 B2 | 10/2004 | Snider | |
| 6,882,830 B2 | 4/2005 | Higuchi | |
| 6,983,132 B2 | 1/2006 | Woo et al. | |
| 7,058,380 B2 | 6/2006 | Sato | |
| 7,092,676 B2 | 8/2006 | Abdelgany et al. | |
| 7,532,867 B1 | 5/2009 | Mo et al. | |
| 2008/0132192 A1 | 6/2008 | Lim | |
| 2009/0022246 A1 | 1/2009 | Ando | |
| 2009/0154377 A1* | 6/2009 | Tsuda et al. | 370/277 |
| 2010/0048155 A1 | 2/2010 | Wang | |
| 2011/0053544 A1* | 3/2011 | Wenink et al. | 455/255 |

FOREIGN PATENT DOCUMENTS

| | | | | |
|---|---|---|---|---|
| EP | 780993 A2 * | 6/1997 | | H04B 1/40 |
| EP | 1473844 A1 * | 11/2004 | | |
| KR | 1020060122095 A | 11/2006 | | |
| KR | 1020070021006 A | 2/2007 | | |

OTHER PUBLICATIONS

Written Opinion of the International Searching Authority dated Apr. 6, 2012 in connection with International Patent Application No. PCT/KR2011/006394.

International Search Report dated Apr. 6, 2012 in connection with International Patent Application No. PCT/KR2011/006394.

* cited by examiner

*Primary Examiner* — Ajibola Akinyemi

(57) ABSTRACT

A multi-band radio operates in a wireless network. The multi-band radio includes a receiver configured to receive a signal. A switch in the receiver is configured to route a signal having a frequency within a first band of frequencies to a first path and a second band of frequencies to a second path. A mixer in the receiver is positioned along the second path. The mixer in the receiver configured to convert a signal having a frequency within the second band of frequencies into a signal having an intermediate frequency within the first band of frequencies.

20 Claims, 6 Drawing Sheets

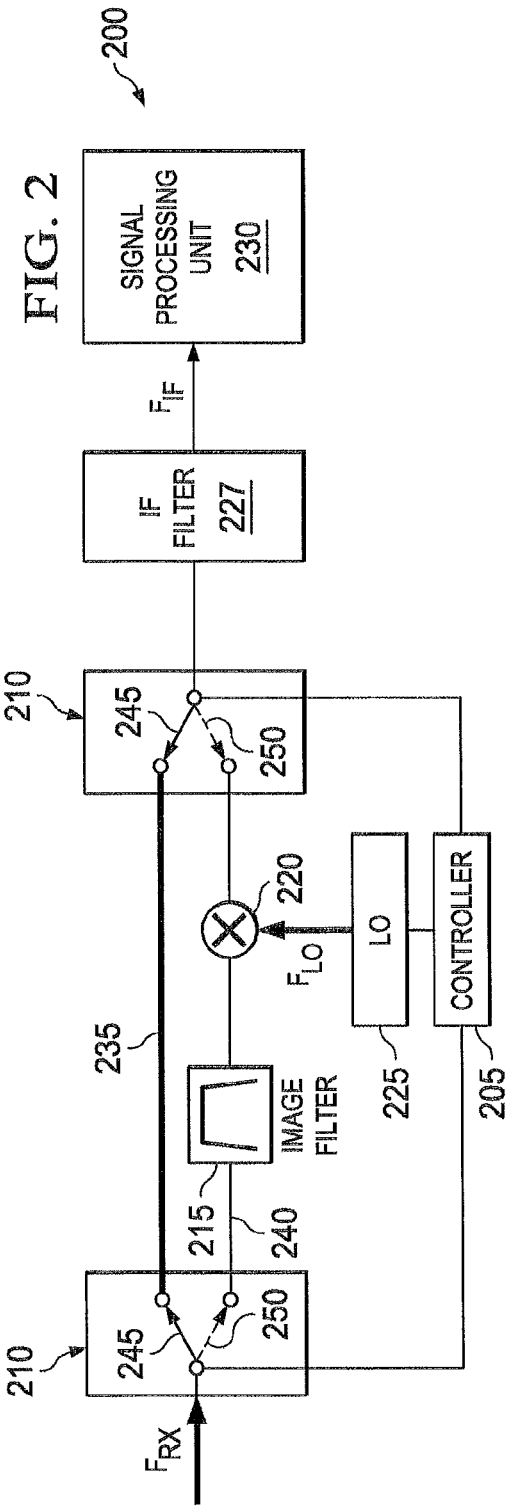
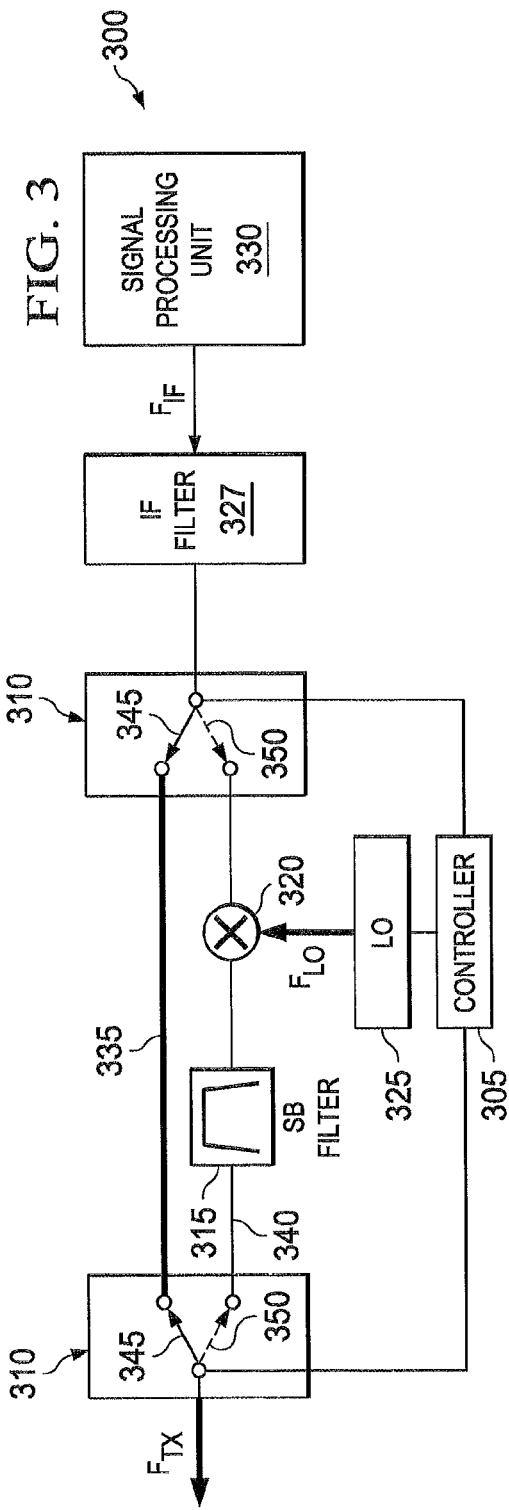

APPARATUS AND METHOD FOR A MULTI-BAND RADIO OPERATING IN A WIRELESS NETWORK

CROSS-REFERENCE TO RELATED APPLICATION(S) AND CLAIM OF PRIORITY

The present application is related to U.S. Provisional Patent Application No. 61/378,347, filed Aug. 30, 2010, entitled "EQUIVALENT IF ARCHITECTURE FOR MULTI-BAND RADIOS". Provisional Patent Application No. 61/378,347 is assigned to the assignee of the present application and is hereby incorporated by reference into the present application as if fully set forth herein. The present application hereby claims priority under 35 U.S.C. §119(e) to U.S. Provisional Patent Application No. 61/378,347.

TECHNICAL FIELD OF THE INVENTION

The present application relates generally to multi-band radios and, more specifically, to transceiver architecture in a multi-band radio.

BACKGROUND OF THE INVENTION

As worldwide communication standards such as Long-Term Evolution (LTE) and Worldwide Interoperable Microwave Access (WiMax) have evolved, so too has the allocation of frequency bands required to deploy these networks on a global level. Due to the large number of defined frequency bands, cellular operators desire radios that can electronically tune to any specific operating band without hardware changes.

Current solutions address the problem of multi-band radio operation based on a brute force approach. For example, current solutions use multiple receiver and transmitter chains, each tuned to a specific narrow band of frequencies. The multiple chains are then combined or separated.

However, the current solutions result in radios having large numbers of hardware components. These approaches are costly and result in an increase in the size of radios. Further, construction and maintenance of such radios may be costly.

Therefore, there is a need in the art for an improved multi-band radio. In particular, there is a need for a transceiver for a radio that is capable of sending and receiving signals in multiple bands with reduced, cost, size, and complexity compared to prior art.

SUMMARY OF THE INVENTION

To address the above-discussed deficiencies of the prior art, it is a primary object to provide, a multi-band radio for use in a wireless network. The multi-band radio includes a receiver configured to receive a signal. A switch in the receiver is configured to route a signal having a frequency within a first band of frequencies to a first path and a second band of frequencies to a second path. A mixer in the receiver is positioned along the second path. The mixer in the receiver configured to convert a signal having a frequency within the second band of frequencies into a signal having a frequency within the first band of frequencies.

To address the above-discussed deficiencies of the prior art, it is also an object to provide, a multi-band radio for use in a wireless network. The multi-band radio includes a receiver and a transmitter. A switch in the receiver is configured to route a signal having a frequency within a first band of receive frequencies to a first receive path and a second band of receive frequencies to a second receive path. A mixer in the receiver is positioned along the second receive path. The mixer is configured to convert a signal having a frequency within the second band of receive frequencies into a signal having a frequency within the first band of receive frequencies. A local oscillator is operably connected to the mixer in the receiver. The local oscillator is configured to provide a signal at a selected frequency to the mixer in the receiver. An image filter is positioned along the second receiver path before the mixer in the receiver. The image filter is configured to filter out noise and signals at frequencies within an image band of frequencies. The image band comprises frequencies equal to the selected frequency minus the intermediate frequency. A switch in the transmitter is configured to route a signal at an intermediate frequency within a first band of transmit frequencies to one of a first transmit path and a second transmit path. A mixer in the transmitter is positioned along the second transmit path. The mixer in the transmitter is configured to convert the signal at the intermediate frequency to a signal having a frequency within a second band of transmit frequencies.

To address the above-discussed deficiencies of the prior art, it is further an object to provide, a method for configuring a transceiver of a multi-band radio for use in a wireless network. An operating band of frequencies for the transceiver is identified. A switch is set to route signals received by the transceiver to a path including an image filter and a mixer in response to identifying that the operating band is a high band. A selected frequency of a local oscillator operably connected to the mixer is set such that a difference of a frequency of a received signal and the selected frequency is within an intermediate band of frequencies of the transceiver.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 illustrates a receiver in a transceiver of a multi-band radio according to the present disclosure;

FIG. 3 illustrates a transmitter in a transceiver of a multi-band radio according to the present disclosure;

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged radio.

Figure 1:
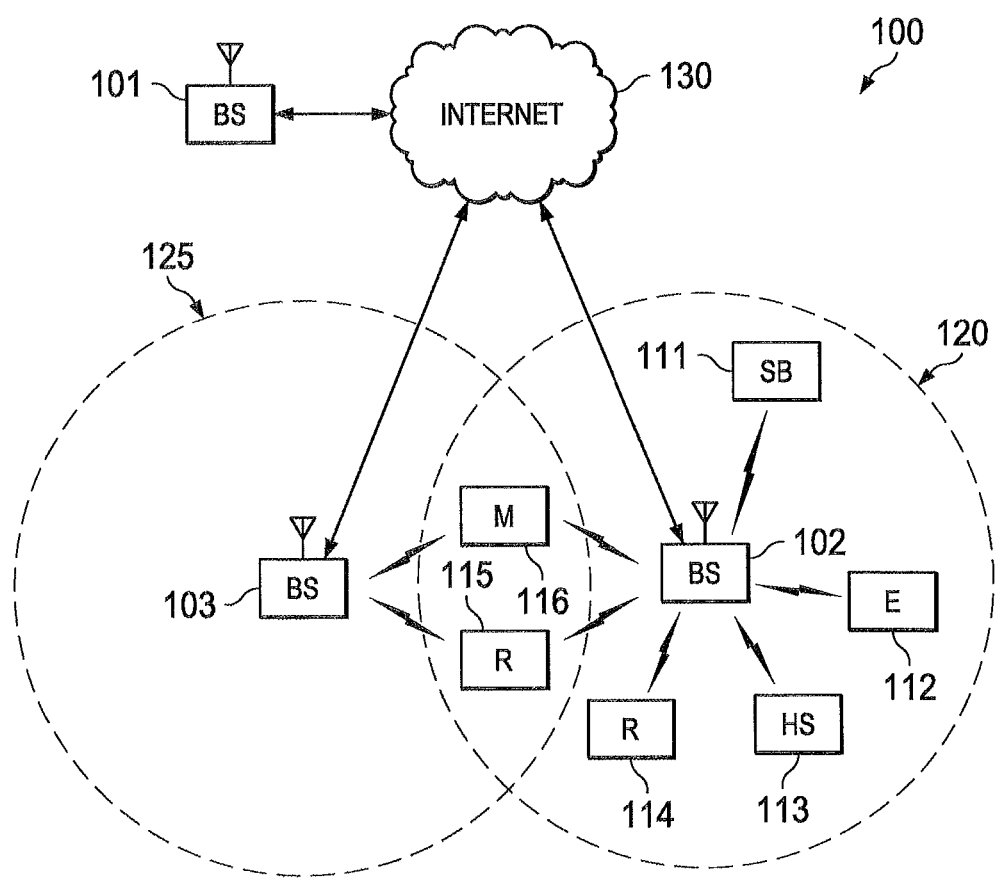
FIG. 1 illustrates a wireless network which transmits and receives messages according to the present disclosure.

FIG. 1 illustrates a wireless network which transmits and receives messages according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM, OFDMA, CDMA, and/or GSM techniques.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

While only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those skilled in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Each of base stations 101-103 and subscriber stations 111-116 may include a radio for sending and receiving signals in wireless network 100. As discussed above, an improved radio is provided in the present disclosure. The present disclosure provides a Software Defined Radio (SDR). The SDR is a radio system that uses electronic tunability to achieve flexible selection of desired operating frequency band and mode of operation.

Rather than using multiple transmitter and receiver chains, the present disclosure takes advantage of a natural gap in standardized wireless communication bands. For example, LTE operating bands arranged in order of increasing numerical frequency instead of increasing operating band number are provided in TABLE 1 below.

TABLE 1

| LTE Band | RX Bands | | TX Bands | |
|---|---|---|---|---|
| | $F_{LOW}$ (MHz) | $F_{HIGH}$ (MHz) | $F_{LOW}$ (MHz) | $F_{HIGH}$ (MHz) |
| 12 | 698 | 716 | 728 | 746 |
| 17 | 704 | 716 | 734 | 746 |
| 13 | 777 | 787 | 746 | 756 |
| 14 | 788 | 798 | 758 | 768 |
| 20 | 815 | 830 | 791 | 821 |
| 18 | 824 | 849 | 860 | 875 |
| 5 | 830 | 840 | 869 | 894 |
| 6 | 830 | 845 | 875 | 885 |
| 19 | 832 | 862 | 875 | 890 |
| 8 | 880 | 915 | 925 | 960 |
| 11 | 1427.9 | 1447.9 | 1475.9 | 1495.9 |
| 21 | 1447.9 | 1462.9 | 1495.9 | 1510.9 |
| 3 | 1710 | 1755 | 1805 | 1880 |
| 9 | 1710 | 1770 | 1844.9 | 1879.9 |
| 35 | 1710 | 1785 | 1850 | 1910 |
| 39 | 1749.9 | 1784.9 | 1880 | 1920 |
| 33 | 1850 | 1910 | 1900 | 1920 |
| 37 | 1850 | 1910 | 1910 | 1930 |
| 2 | 1880 | 1920 | 1930 | 1990 |
| 36 | 1900 | 1920 | 1930 | 1990 |
| 34 | 1910 | 1930 | 2010 | 2025 |
| 4 | 1920 | 1980 | 2110 | 2155 |
| 1 | 1930 | 1990 | 2110 | 2170 |
| 10 | 2010 | 2025 | 2110 | 2170 |
| 40 | 2300 | 2400 | 2300 | 2400 |
| 38 | 2500 | 2570 | 2570 | 2620 |
| 7 | 2570 | 2620 | 2620 | 2690 |

The frequency bands are clustered into three main groups that exhibit a natural gap in between the groups. For BS receive (RX) bands, the groups are low-band 698-915 MHz, mid-band 1427.9-1462.9 MHz (used in Japan), and high-band 1710-2620 MHz. For BS transmit (TX) bands, the groups are low-band 728-960 MHz, mid-band 1475.9-1510.9 MHz (used in Japan) and high-band 1805-2690 MHz. The transceiver architecture of the present disclosure utilizes the natural gaps between the groups and splits multiple frequency bands into a small number of larger bands.

FIG. 2 illustrates a receiver in a transceiver of a multi-band radio according to the present disclosure. In this illustrative embodiment, receiver 200 includes controller 205, switches 210, image filter 215, mixer 220, local oscillator 225, intermediate frequency filter 227, and signal processing unit 230. In these illustrative examples, receiver 200 may be implemented in any one of base stations 101-103 and subscriber stations 111-116 in wireless network 100.

In this illustrative embodiment, signals received by receiver 200 pass through one of first path 235 and second path 240. Signals traveling on first path 235 pass through receiver 200 to signal processing unit 230. In these examples, signal processing unit 230 includes circuitry for retrieving data from signals received by receiver 200. Signals that travel along first path 235 have frequencies in a first band of frequencies that are within an intermediate frequency (IF) band of IF filter 227 and signal processing unit 230. An IF is a frequency to which a carrier frequency is shifted during transmission or reception. In these examples, signals having frequencies within the intermediate frequency (IF) band can be processed by signal processing unit 230.

Signals traveling on second path 240 pass through image filter 215 and mixer 220 before reaching IF filter 227 and signal processing unit 230. Signals that travel along second path 240 have frequencies in a second band of frequencies. The second band is not within the IF band of signal processing unit 230. Mixer 220 shifts the frequency of signals traveling on second path 240 to a frequency that is within the IF band for IF filter 227 and signal processing unit 230.

Local oscillator 225 provides a signal to mixer 220. Mixer 220 produces main signals at two frequencies. One of the signals has a frequency equal to the sum of the frequency of the received signal ($F_{RF}$) and the frequency of the signal from local oscillator 225 ($F_{LO}$), called upper sideband (USB). The other signal has a frequency equal to the difference of $F_{RF}$ and $F_{LO}$, called lower sideband (LSB) One of the signals, for example the USB, is filtered out by IF filter 227. The other is processed by signal processing unit 230. By appropriately selecting $F_{LO}$, receiver 200 shifts frequencies of signals received that are not within the IF band of signal processing unit 230 into frequencies that are.

In this illustrative embodiment, controller 205 configures receiver 200 for operation based on the band of frequencies used where receiver 200 is located. For example, upon activation of receiver 200, controller 205 receives configuration information about an operating band of frequency used where receiver 200 is located. If the operating band is within the first band, controller 205 sets switches 210 to first position 245 for signals received to travel along first path 235. If the operating band is within the second band, controller 205 sets switches to second position 250 for signals received to travel along second path 240.

Additionally, controller 205 sets $F_{LO}$ for local oscillator 225. For example, if IF filter 227 is set to filter out signals at $F_{RF}$ plus $F_{LO}$, then $F_{LO}$ can be calculated according to equation 1 provided below.

$$F_{LO}=|F_{RF}-F_{IF}| \quad (1)$$

where $F_{RF}$ is the frequency of the incoming signal and $F_{IF}$ is a desired IF for processing signals by signal processing unit 230.

Image filter 215 filters out images that may be present in signals received at receiver 200 before mixing by mixer 220. For example, the image ($F_{Image}$) is an undesired band (usually noise) which when down converted through a mixer ends up at an IF frequency that is identical to the desired IF that results from down conversion of the desired band. This is a consequence of the mixing operation. For example, if an incoming signal $F_{RF}$=2500 MHz and $F_{LO}$=2000 MHz the desired IF=$|F_{RF}-F_{LO}|$=500 MHz. However, noise located at $F_{Image}$=1500 MHz results in IF=$|F_{Image}-F_{LO}|$=|1500-2000|=500 MHz, which equals the desired IF.

This image noise has the same frequency of the desired IF and doubles noise in the signal output from mixer 220. For example, the conversion of image noise may increase mixer noise by 3 dB. Depending upon the sensitivity of components in signal processing unit 230, this noise may exceed signal to noise ratios and result in dropped packets, thereby decreasing bit error rate (BER) below acceptable levels. Image filter 215 reduces image noise that may interfere with signals at the desired IF. Image filter 215 is set to filter out signals at $F_{Image}$.

In one illustrative example, $F_{IMAGE}=F_{LO}-F_{IF}$ when low-side mixing is used (i.e. $F_{LO}<F_{RF}$), or $F_{IMAGE}=F_{LO}+F_{IF}$ when high-side mixing is used (i.e. $F_{LO}>F_{RF}$), where $F_{LO}$=local oscillator frequency applied to the mixer, and $F_{IF}=|F_{RF}-F_{LO}|$, the intermediate frequency.

For example, $F_{Image}$ may be calculated according to equation 2 provided below.

$$F_{IMAGE}=F_{LO}-F_{IF} \quad (2)$$

when low-side mixing is used (i.e. $F_{LO}<F_{RX}$), where $F_{IF}$ is a desired IF for processing signals by signal processing unit 230 and $F_{LO}$ is the frequency of signals provided by local oscillator 225 and where $F_{IF}=|F_{RX}-F_{LO}|$, the intermediate frequency.

In another example, $F_{Image}$ may be calculated according to equation 3 provided below.

$$F_{IMAGE}=F_{LO}+F_{IF} \quad (3)$$

when high-side mixing is used (i.e. $F_{LO}>F_{RX}$), where $F_{IF}=|F_{RX}-F_{LO}|$, the intermediate frequency.

In an exemplary embodiment for operation of receiver 200, "low-band" receiver frequencies (e.g. 698-915 MHz) may be defined as the intermediate frequency for receiver 200. Signals having frequencies within the low-band shall bypass image filter 215, mixer 220 and go to signal processing unit 230. Controller 205 may power off local oscillator 225 to increase efficiency of receiver 200. For any "high-band" frequency (e.g. 1710-2620 MHz) entering receiver 200, the frequency is filtered and mixed down to a frequency within the IF band. For example, signals within the high-band may be mixed and filtered into an equivalent IF for signal processing unit 230.

Exemplary frequency selections for operation of receiver 200 at selected LTE bands are shown in TABLE 2 below.

TABLE 2

| | LTE Band | | | | | | | | | |
|---|---|---|---|---|---|---|---|---|---|---|
| | RX Band Frequencies | | | LO | IF Band Frequencies | | | Image Band Frequencies | | |
| Band | $F_{RF(min)}$ (MHz) | $F_{RF}$ (MHz) | $F_{RF(max)}$ (MHz) | $F_{LO}$ (MHz) | $F_{IF(min)}$ (MHz) | $F_{IF}$ (MHz) | $F_{IF(max)}$ (MHz) | $F_{Image(min)}$ (MHz) | $F_{Image}$ (MHz) | $F_{Image(max)}$ (MHz) |
| 12 | 698 | 707 | 716 | LO = off | 698 | 707 | 716 | no mixing = no image | | |
| 5 | 824 | 836.5 | 849 | LO = off | 824 | 836.5 | 849 | no mixing = no image | | |
| 8 | 880 | 897.5 | 915 | LO = off | 880 | 897.5 | 915 | no mixing = no image | | |
| 3 | 1710 | 1747.5 | 1785 | 941.5 | 768.5 | 806 | 843.5 | 98 | 135.5 | 173 |
| 2 | 1850 | 1880 | 1910 | 1074 | 776 | 806 | 836 | 238 | 268 | 298 |
| 1 | 1920 | 1950 | 1980 | 1144 | 776 | 806 | 836 | 308 | 338 | 368 |
| 34 | 2010 | 2017.5 | 2025 | 1211.5 | 798.5 | 806 | 813.5 | 398 | 405.5 | 413 |
| 40 | 2300 | 2350 | 2400 | 1544 | 756 | 806 | 856 | 688 | 738 | 788 |
| 7 | 2500 | 2535 | 2570 | 1729 | 771 | 806 | 841 | 888 | 923 | 958 |
| 38 | 2570 | 2595 | 2620 | 1789 | 781 | 806 | 831 | 958 | 983 | 1008 |

The exemplary frequency selections shown in TABLE 2 provide several advantages to the architecture of receiver 200. For example, the range of frequencies for $F_{LO}$ is between 941.5 and 1789 MHz. This range is less than one octave (1000 MHz). The range being less than one octave allows the use of low-cost commercial grade synthesizers for local oscillator 225.

Additionally, because the low-band frequencies (698-915 MHz) do not get down converted by mixer 220, no image bands are created and therefore no image filter is required for the low-bands. As a result, the image bands (98-1008 MHz) created by the "high-bands" do not overlap any of the incoming RX high-bands (1710-2620 MHz). Therefore, a single image filter may be used to filter frequencies below 1008 MHz without loss of signal in the incoming RX high-bands. Additionally, since the largest image frequency (1008 MHz) is much lower than the lowest RX frequency (1710 MHz), attenuation requirements of image filter 215 are reduced. As a result, filter cost and size may be suitable for volume production.

Additionally, as shown in TABLE 2, while incoming RX signals have frequencies ranging between 698 MHz and 2620 MHz, the IF band ranges between 698 MHz and 915 MHz. In this example, IF filter 227 may be a band-pass filter having a passband of 915–698=217 MHz. Thus, signals processed by signal processing unit 230 have a limited range in signal, while receiver 200 can receive signals in multiple bands having a larger range in frequencies (698-2620 MHz for RX). Further, operation of receiver 200 to receive multiple bands simply uses tuning of $F_{LO}$ produced by local oscillator 225 and switching of switches 210. Receiver 200 does not need multiple receiver chains for individual bands of frequencies. Additionally, hardware in receiver 200 does not need to be replaced for receiver 200 to operate in different bands. Controller 205 simply sets $F_{LO}$ and switches 210 for receiver 200 to operate in multiple bands.

FIG. 3 illustrates a transmitter in a transceiver of a multi-band radio according to the present disclosure. In this illustrative embodiment, transmitter 300 includes controller 305, switches 310, sideband filter 315, mixer 320, local oscillator 325, intermediate frequency filter 327, and signal processing unit 330. In these illustrative examples, transmitter 300 may be implemented in any one of base stations 101-103 and subscriber stations 111-116 in wireless network 100.

In this illustrative embodiment, signals to be transmitted by transmitter 300 are generated by signal processing unit 330. The signals generated by signal processing unit 330 pass through IF filter 327 and are at the IF for transmitter 300. Depending on the operating band for transmitter 300, switches 310 will pass signals to be transmitted to one of first path 345 and second path 350. For example, if the operating band is in a first band of frequencies, controller 305 sets switches 310 to first position 345. Signals generated by signal processing unit 330 will bypass mixer 320 and sideband filter 315 on first path 335.

If the operating band is in a second band of frequencies, controller 305 sets switches 310 to second position 350. Signals generated by signal processing unit 330 travel along second path 340. Mixer 320 converts the signal at the IF to a signal having a frequency in the operating band for transmitter 300. Mixer 320 produces main signals at two frequencies. One of the signals has a frequency equal to the sum of the IF of the generated signal ($F_{IF}$) and the frequency of the signal from local oscillator 325 ($F_{LO}$) called upper sideband. The other signal has a frequency equal to the difference of $F_{IF}$ and $F_{LO}$, called lower sideband. One of the signals, for example the LSB, is filtered out by side-band (SB) filter 315. The other signal is transmitted by transmitter 300.

In one illustrative example, SB filter 315 may be a lower side-band (LSB) filter. In this example, the LSB filter filters out the signal resulting from the difference of $F_{IF}$ and $F_{LO}$, while the sum of $F_{IF}$ and $F_{LO}$ passes through the LSB filter.

Filtering out the LSB will improve the performance of follow-on amplifier stages (not shown). For example, two signals of equal power (LSB and USB) would travel through follow-on amplifier stages. The amplifiers would need to handle twice as much power (3 dB). By filtering out the LSB, amplifiers may require just half the power and linearity rating. In this example, SB filter 315 may be a high-pass filter with maximum attenuation at frequency ($F_{LSB}$) that may be calculated according to equation 4 provided below.

$$F_{LSB} = |F_{IF} - F_{LO}| \quad (4)$$

In this illustrative embodiment, signals mixed by mixer 320 do not encounter the image noise issues discussed above with regard to receiver 200 because the image band is removed by IF filter 327. IF filter 327 is a band-pass filter having a passband set to the width of the IF band of transmitter 300. In one example, IF filter 327 is a fixed band-pass filter. IF filter 327 filters out, for example, images from a digital-to-analog converter, noise, and other spurious signals that may be present outside of the IF band of transmitter 300.

Thus, IF filter reduces an amount of noise or spurious signal from frequencies outside the IF band that could be added when a signal is mixed by mixer 320.

In an exemplary embodiment for operation of transmitter 300, "Low-band" transmitter frequencies (e.g. 728-960 MHz) may be defined as the "Equivalent IF" band for transmitter 300. Signals having frequencies within the low-band shall bypass mixer 320 and SB filter 315 and be transmitted by transmitter 300. Controller 305 may power off local oscillator 325 to increase efficiency of transmitter 300. For any "high-band" frequency (e.g. 1805-2690 MHz) used as the output of transmitter 300, signals at the IF are up-converted through mixer 320 and SB filter 315 to the desired TX operating band.

Exemplary frequency selections for operation of transmitter 200 at selected LTE bands are shown in TABLE 3 below.

TABLE 3

| | | | | LTE Band | | | | | |
|---|---|---|---|---|---|---|---|---|---|
| | TX Band Frequencies | | | LO | IF Band Frequencies | | | LSB Band Frequencies | | |
| Band | $F_{RF(min)}$ (MHz) | $F_{RF}$ (MHz) | $F_{RF(max)}$ (MHz) | $F_{LO}$ (MHz) | $F_{IF(min)}$ (MHz) | $F_{IF}$ (MHz) | $F_{IF(max)}$ (MHz) | $F_{LSB(min)}$ (MHz) | $F_{LSB}$ (MHz) | $F_{LSB(max)}$ (MHz) |
| 12 | 728 | 737 | 746 | LO = off | 728 | 737 | 746 | no mixing = no LSB | | |
| 5 | 869 | 881.5 | 894 | LO = off | 869 | 881.5 | 894 | no mixing = no LSB | | |
| 8 | 925 | 942.5 | 960 | LO = off | 925 | 942.5 | 960 | no mixing = no LSB | | |
| 3 | 1805 | 1842.5 | 1880 | 998.5 | 806.5 | 844 | 881.5 | 117 | 154.5 | 192 |
| 2 | 1930 | 1960 | 1990 | 1116 | 814 | 844 | 874 | 242 | 272 | 302 |
| 34 | 2010 | 2017.5 | 2025 | 1173.5 | 836.5 | 844 | 851.5 | 322 | 329.5 | 337 |
| 1 | 2110 | 2140 | 2170 | 1296 | 814 | 844 | 874 | 422 | 452 | 482 |
| 40 | 2300 | 2350 | 2400 | 1506 | 794 | 844 | 894 | 612 | 662 | 712 |
| 38 | 2570 | 2595 | 2620 | 1751 | 819 | 844 | 869 | 882 | 907 | 932 |
| 7 | 2620 | 2655 | 2690 | 1811 | 809 | 844 | 879 | 932 | 967 | 1002 |

The exemplary frequency selections shown in TABLE 3 provide several advantages to the architecture of transmitter 300. For example, transmitter 300 is able to transmit signals in a wide range of frequencies (728-2690 MHz). Yet, the signals generated by signal processing unit 330 are compressed into a single narrow-band channel of 960−728=232 MHz bandwidth (the Equivalent IF). The architecture of transmitter 300 does not require switching in or out entire transmitter chains or multiple LO. Controller 305 simply sets $F_{LO}$ and switches 210 for transmitter 300 to operate in multiple bands.

Additionally, the range of frequencies for $F_{LO}$ is between 998.5 MHz and 1811 MHz. This range is less than one octave (1000 MHz). The range being less than one octave allows the use of low-cost commercial grade synthesizers for local oscillator 325.

Further, because the low-band frequencies (728-960 MHz) are not down converted by mixer 320, no LSB bands are created. Therefore, LSB bands (117-1002 MHz) created by mixing high-bands do not overlap any of the desired TX high-bands (1805-2690 MHz). Therefore, a single LSB band filter may be used to filter frequencies below 1002 MHz without loss of signal in the outgoing TX bands (1805-2690). Additionally, since the largest LSB frequency (1002 MHz) is much lower than the lowest TX frequency (1805 MHz), attenuation requirements of SB filter 315 are reduced. As a result, filter cost and size may be suitable for volume production.

Figure 4:
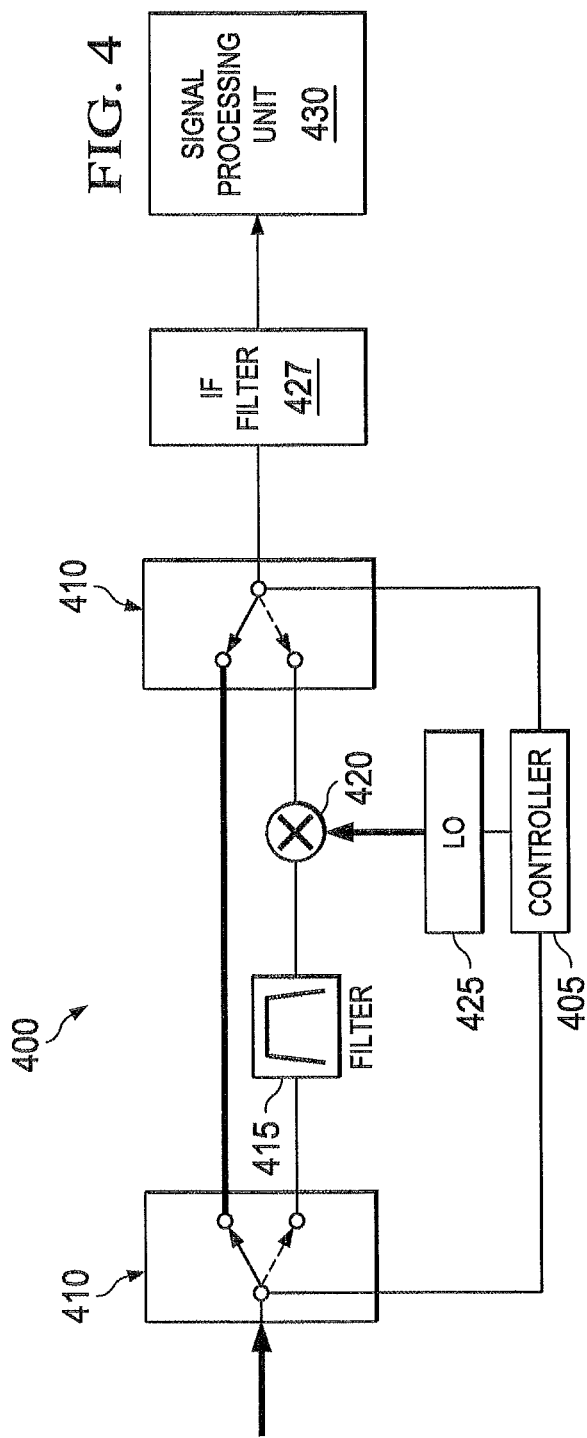
FIG. 4 illustrates a feedback receiver in a transceiver of a multi-band radio according to the present disclosure.

FIG. 4 illustrates a feedback receiver in a transceiver of a multi-band radio according to the present disclosure. In this illustrative embodiment, feedback receiver 400 includes controller 405, switches 410, filter 415, mixer 420, local oscillator 425, IF filter 427, and signal processing unit 430. In these illustrative examples, feedback receiver 400 may be implemented in any one of base stations 101-103 and subscriber stations 111-116 in wireless network 100.

Feedback receiver 400 may be used in transceiver architectures that support baseband digital predistortion (DPD). Because DPD is ubiquitous in high performance transceivers, most transceiver architectures include feedback receiver 400. Feedback receiver 400 operates similarly to receiver 200. However, the input into feedback receiver 400 typically comes from a directional coupler (not shown) that is sampling power from an output of a power amplifier (PA) connected to transmitter 300.

The input signal coming from the PA typically has signal to noise and distortion ratio (SINAD) of greater than 45 dB depending on the requirements (e.g. LTE requires adjacent channel leakage power ratio (ACLR) greater than 45 dB) and the quality of the DPD used in the transceiver. The signal has noise and distortion levels that are typically 80-100 dB higher than a standard receiver. Due to the high noise levels, a low noise amplifier (LNA) and an image filter may not be needed because degradation of receiver sensitivity is not likely to occur since the signals SNR and SINAD are greater than 45 dB, in contrast to typical receivers that must operate near the noise floor with as little as 5 dB SNR, for example with GSM. However, filter 415 may used to reduce any out of band noise or spurious signals that originates from the PA. In some embodiments, filter 415 may not be used in feedback receiver 400.

Additionally, feedback receiver 400 passes the entire distortion bandwidth from the PA to signal processing unit 400 for signal processing unit 400 to correct non-linearities caused by the PA. DPD systems can correct up to fifth order distortion products. As a result, feedback receiver 400 may need to have a bandwidth at least five times the signal bandwidth. For example, a 20 MHz signal may create fifth order distortion products that occupy a 100 MHz bandwidth.

Exemplary frequency selections for operation of feedback receiver 400 at selected LTE bands are shown in TABLE 4 below.

TABLE 4

| | LTE Band | | | | | | | | | |
|---|---|---|---|---|---|---|---|---|---|---|
| | RF Band Frequencies | | | LO | IF Band Frequencies | | | LSB Band Frequencies | | |
| Band | $F_{RF(min)}$ (MHz) | $F_C$ (MHz) | $F_{RF(max)}$ (MHz) | $F_{LO}$ (MHz) | $F_{IF(min)}$ (MHz) | $F_{IF}$ (MHz) | $F_{IF(max)}$ (MHz) | $F_{LSB(min)}$ (MHz) | $F_C$ (MHz) | $F_{LSB(max)}$ (MHz) |
| 12 | 728 | 737 | 746 | LO = off | 728 | 737 | 746 | no mixing = no LSB | | |
| 5 | 869 | 881.5 | 894 | LO = off | 869 | 881.5 | 894 | no mixing = no LSB | | |
| 8 | 925 | 942.5 | 960 | LO = off | 925 | 942.5 | 960 | no mixing = no LSB | | |
| 3 | 1805 | 1842.5 | 1880 | 998.5 | 806.5 | 844 | 881.5 | 117 | 154.5 | 192 |
| 2 | 1930 | 1960 | 1990 | 1116 | 814 | 844 | 874 | 242 | 272 | 302 |
| 34 | 2010 | 2017.5 | 2025 | 1173.5 | 836.5 | 844 | 851.5 | 322 | 329.5 | 337 |
| 1 | 2110 | 2140 | 2170 | 1296 | 814 | 844 | 874 | 422 | 452 | 482 |
| 40 | 2300 | 2350 | 2400 | 1506 | 794 | 844 | 894 | 612 | 662 | 712 |
| 38 | 2570 | 2595 | 2620 | 1751 | 819 | 844 | 869 | 882 | 907 | 932 |
| 7 | 2620 | 2655 | 2690 | 1811 | 809 | 844 | 879 | 932 | 967 | 1002 |

As shown in TABLE 4 the frequency planning for feedback receiver 400 are similar to that of transmitter 300. The similarities are a result of feedback receiver 400 and transmitter 300 operating at the same frequencies.

The illustration of receiver 200, transmitter 300, and feedback receiver 400 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, receiver 200, transmitter 300, and feedback receiver 400 may use the same controller. Additionally, because of the similarity in frequency selections for transmitter 300 and feedback receiver 400, transmitter 300 and feedback receiver 400 may use the same controller.

In some illustrative embodiments, receiver 200, transmitter 300, and feedback receiver 400 may use the same local oscillator. For example, frequency selections for $F_{IF}$ may be calculated such that $F_{LO}$ is the same for receiver 200, transmitter 300, and feedback receiver 400 for the same operating band. In these illustrative embodiments, space, energy consumption, and cost savings may be realized by the use of a common local oscillator.

In some illustrative embodiments, any form of frequency synthesizer may be used in place of local oscillators 205, 305, and/or 405. Additionally, some illustrative embodiments, feedback receiver 400 may be unnecessary. Further, while receiver 200 has been described in some embodiments as down converting signals in high bands to a lower IF, some embodiments may include up converting signals from low bands to a higher IF. Additionally, while transmitter 300 has been described in some embodiments as up converting signals from a lower IF to high band frequencies, some embodiments may include down converting signals from a higher IF to low band frequencies.

Figure 5:
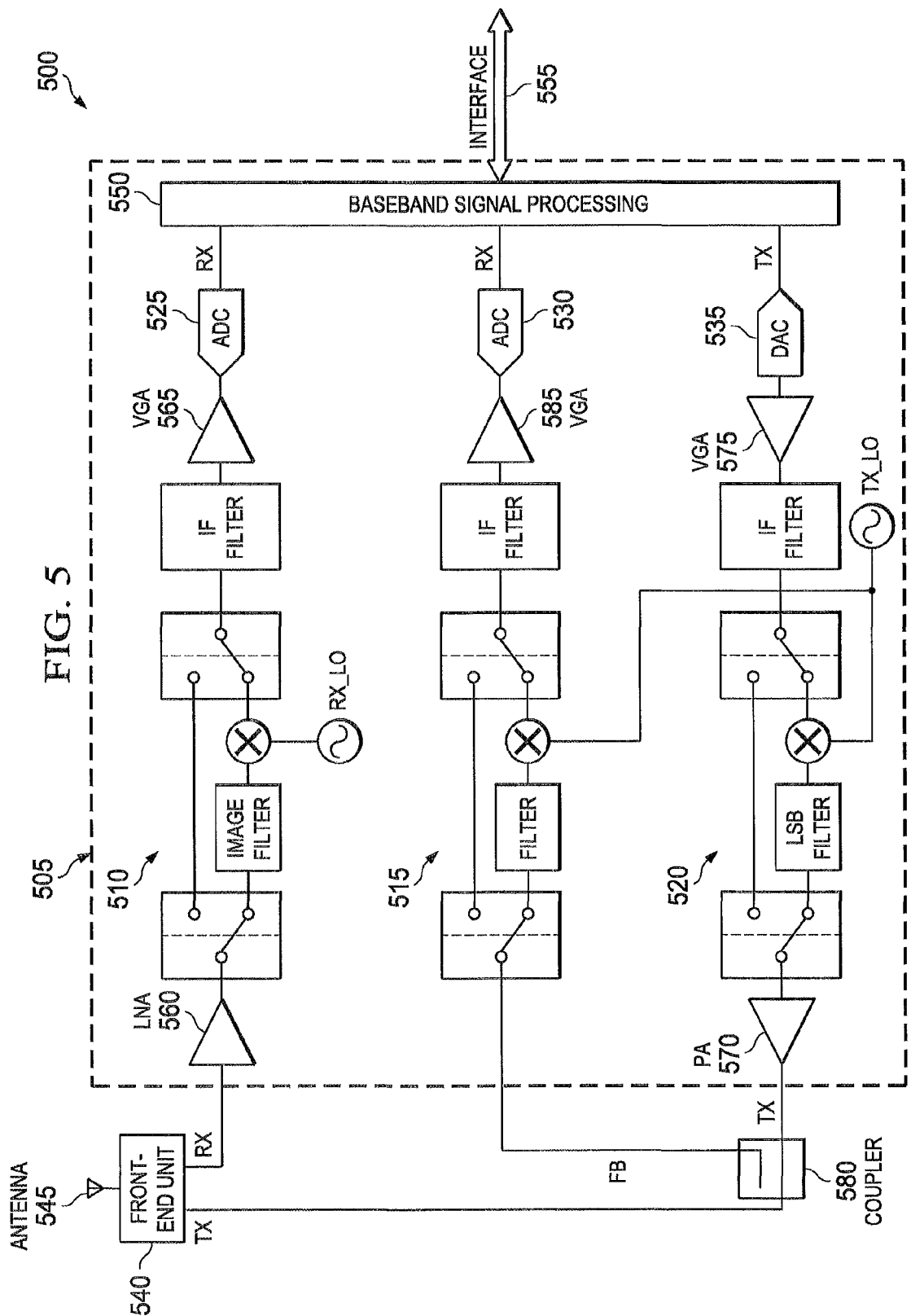
FIG. 5 illustrates a high sample rate transceiver of a multi-band radio according to the present disclosure.

FIG. 5 illustrates a high sample rate transceiver of a multi-band radio according to the present disclosure. Transceiver 505 of multi-band radio 500 includes receiver 510, feedback receiver 515, and transmitter 520. In this illustrative embodiment, transceiver 505 utilizes components having a high-sample rate to reduce part count and a size of transceiver 505. For example, analog-to-digital (ADC) converters 525 and 530 and digital-to-analog (DAC) converter 535 may have a high sample rate and wide bandwidth in order to accommodate high equivalent-IF frequencies in the range 698-915 MHz for RX, and 728-960 MHz for TX.

Multi-band radio 500 includes front end unit (FEU) 540 for interface to antenna 545. Front end unit 540 may include a duplexer for frequency division duplexing (FDD) applications, or a filter plus transmit/receive (T/R) switch for time division duplexing (TDD) applications. FEU components may be tunable or band selectable for multi-band radio 500.

Multi-band radio 500 also includes baseband digital processing system 550. Baseband digital processing system 550 may perform digital up-conversion and down-conversion (DUC, DDC), crest factor reduction (CFR), digital predistortion (DPD), and various digital signal processing (DSP) functions for multi-band radio 500. Multi-band radio 500 also includes interface 555. Interface 555 is an interface to a modem or channel cards of a base station or mobile station. For example, without limitation, interface 555 may be a Common Public Radio Interface (CPRI) or an Open Base Station Architecture Initiative (OBSAI) interface.

In this illustrative embodiment, receiver 510 is an example of one implementation of receiver 200, feedback receiver 515 is an example of one implementation of feedback receiver 400, and transmitter 520 is an example of one implementation of transmitter 300. Additionally, receiver 510 includes low noise amplifier (LNA) 560 and variable gain amplifier 565. In these examples, transmitter 520 includes power amplifier (PA) 570 and variable gain amplifier 575. In some embodiments, PA 570 may not be in the transceiver and instead PA 570 may be in a separate module. Feedback receiver 515 takes input power from coupler 580. Coupler 580 is attached to power amplifier 570 output. Feedback receiver 515 passes the input from coupler 580 through variable gain amplifier 585 to ADC 530. ADC 530 passes the signal back into baseband signal processing system 550 for digital predistortion processing.

Figure 6:
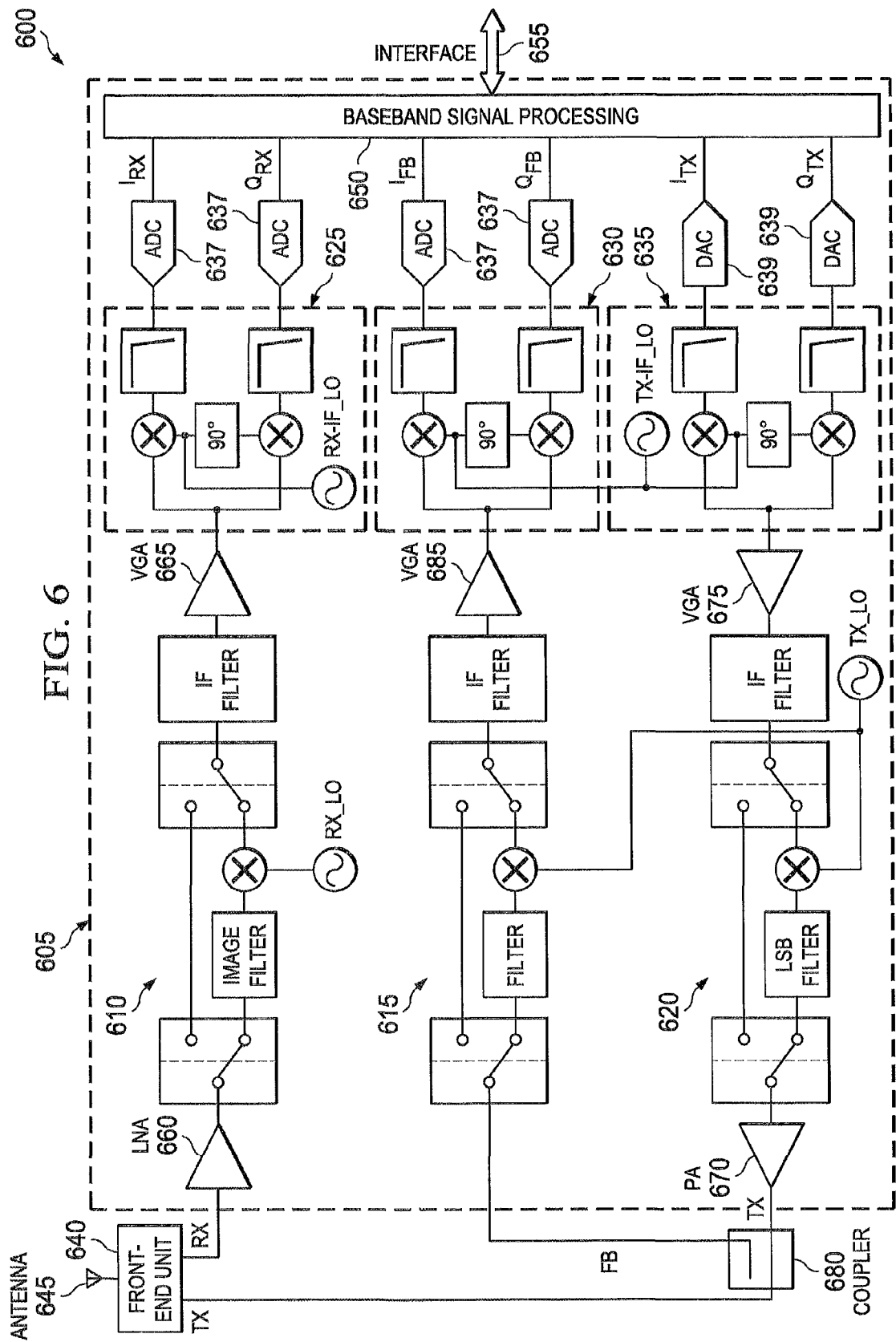
FIG. 6 illustrates a low sample rate transceiver of a multi-band radio according to the present disclosure.

FIG. 6 illustrates a low sample rate transceiver of a multi-band radio according to the present disclosure. Transceiver 605 of multi-band radio 600 includes receiver 610, feedback receiver 615, and transmitter 620.

In this illustrative embodiment, transceiver 605 uses quadrature demodulators 625 and 630 and quadrature modulator 635 in order to reduce the sample rate requirements on ADCs 637 and DACs 639. Quadrature demodulators 625 and 630 translate the equivalent IF of signals entering ADCs 637 to basebands centered at about 0 Hz and thereby reducing input bandwidth and sample rate requirements for ADCs 637. Quadrature modulator 635 translates a 0 Hz baseband signal from DACs 639 up to the equivalent IF, and therefore reduces bandwidth and sample rate requirements of DACs 639. In this illustrative embodiment, there may be a higher component count and larger PCB size than in transceiver 505.

In this illustrative embodiment, receiver 610 is an example of one implementation of receiver 200, feedback receiver 615 is an example of one implementation of feedback receiver 400, and transmitter 620 is an example of one implementation of transmitter 300. Multi-band radio 600 also includes front end unit (FEU) 640 for interface to antenna 645. Front end unit 640 may include a duplexer for frequency division duplexing (FDD) applications, or a filter plus transmit/receive (T/R) switch for time division duplexing (TDD) applications. FEU components may be tunable or band selectable for multi-band radio 600.

Additionally, in this illustrative example receiver 610 includes low noise amplifier (LNA) 660 and variable gain amplifier 665. In some embodiments, LNA 660 may be inside FEU 640 to improve transceiver card channel-to-channel isolation. Transmitter 620 includes power amplifier (PA) 670 and variable gain amplifier 675. Feedback receiver 615 takes input power from coupler 680 attached to power amplifier 670 output. Feedback receiver 615 passes the input from coupler 680 through variable gain amplifier 685 to quadrature demodulator 630, which converts the RF passband signal into a baseband signal with separate in-phase (I) and quadrature (Q) signals for the ADCs 637. ADCs 637 passes the in-phase (I) and quadrature (Q) signals back into baseband signal processing system 650 for digital predistortion processing.

The illustration of multi-band radio 500 and multi-band radio 600 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some embodiments, multi-band radios 500 and 600 may include different numbers of receive and transmit paths to support receiver and transmitter diversity. In some embodiments, additional paths may be utilized to support multiple input multiple output (MIMO) transceivers.

Some embodiments may use different combinations of quadrature modulators and demodulators. For example, each receiver, transmitter, and feedback receiver in multi-band radios 500 and 600 may independently use or not use a quadrature modulator/demodulator. In some embodiments, only one local oscillator may be used for the quadrature modulators and demodulators. Some embodiments may use tunable and/or band selectable filters for bandwidth selection. For example, image filters and sideband filters in multi-band radios 500 and 600 may be tunable or band selectable.

Figure 7:
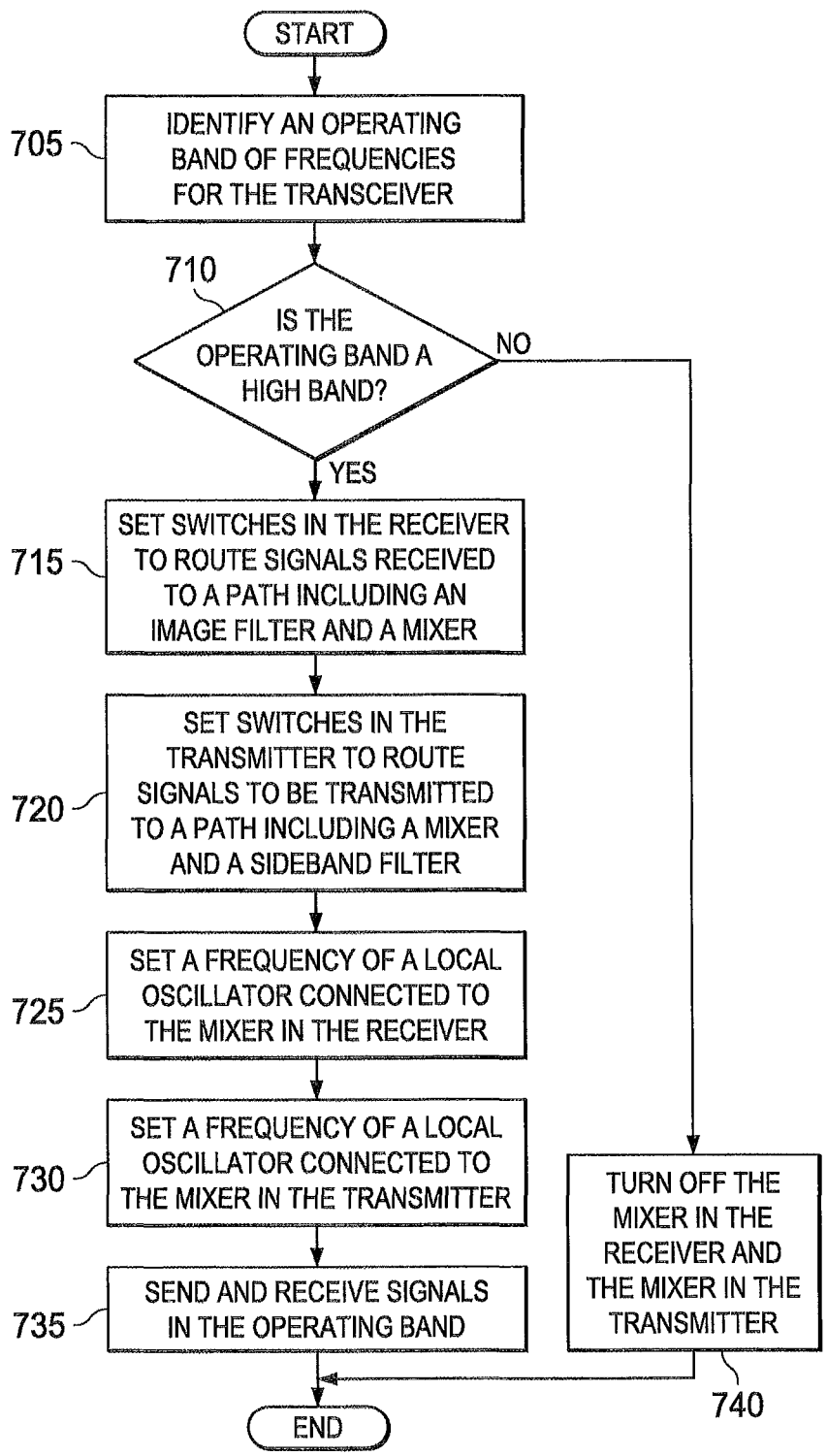
FIG. 7 illustrates a process for configuring a transceiver of a multi-band radio for operation in a wireless network in accordance with the present disclosure.

FIG. 7 illustrates a process for configuring a transceiver of a multi-band radio for operation in a wireless network in accordance with the present disclosure. The process illustrated in FIG. 7 may be implemented by controllers 205, 305, and/or 405 in multi-band radios 500 and/or 600.

The process begins by identifying an operating band of frequencies for the transceiver (block 705). In block 705, the operating band is a band of frequencies that the transceiver may be required to operate in order to send and receive signals. The process then determines whether the operating band is a high band (block 710). If, the process determines that the operating band is a high band, the process sets switches in the receiver to route signals received to a path including an image filter and a mixer (block 715). Thereafter, the process sets switches in the transmitter to route signals to be transmitted to a path including a mixer and a sideband filter (block 720).

The process then sets a frequency of a local oscillator connected to the mixer in the receiver (block 725). Thereafter, the process sets a frequency of a local oscillator connected to the mixer in the transmitter (block 730). In some embodiments, one local oscillator may be used for the receiver and the transmitter. Thus, block 730 may not be necessary.

Returning to block 710, if the process determines that the operating band is a low band, the received and transmitted signals will bypass the mixer and filters and the process turns off the mixer in the receiver and the mixer in the transmitter (block 740), with the process terminating thereafter. In block 740, turning off the mixer in the receiver and the mixer in transmitter will improve efficiency in the transceiver. If the transmitter and the receiver share a common LO, then in block 740 the process will turn off the common LO.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A multi-band radio for use in a wireless network, the multi-band radio comprising:
a receiver having an input connected to an antenna and output connected to a signal processing unit; and
a pair of switches in the receiver configured to route input signals from the antenna having a frequency within an intermediate frequency (IF) band of the receiver on a first path directly to an IF filter and the signal processing unit, and to route signals with a frequency greater than the IF band on a second path through an image filter and a mixer then to the IF filter and signal processing unit.

2. The multi-band radio of claim 1 further comprising:
a transmitter having an input connected to an antenna and output connected to the signal processing unit; and
a pair of switches in the transmitter configured to route signals from the signal processing unit on a first transmit path to the antenna when an output signal frequency is within the IF band, and to route signals from the signal processing unit on a second transmit path through a mixer and a sideband filter when the output signal frequency is greater than the IF band.

3. The multi-band radio of claim 2 further comprising:
a local oscillator operably connected to the mixer in the transmitter, the local oscillator (LO) configured to provide a signal at a selected frequency to the mixer in the transmitter to convert an IF to a desired output frequency; and
a sideband filter positioned along the second transmit path after the mixer in the transmitter, the sideband filter having a fixed cutoff frequency to support multiple bands without changing filters, and configured to filter out frequencies within a sideband of frequencies, wherein the sideband of frequencies comprises frequencies equal to a frequency of the local oscillator minus IF, or the frequency of the local oscillator plus the IF depending on whether low-side or high-side mixing is used.

4. The multi-band radio of claim 3 further comprising:
a controller configured to identify an operating band of transmit frequencies where the multi-band radio will transmit signals, set the selected frequency of the local oscillator, and set the switches to route signals to be transmitted to one of the first transmit path and the second transmit path.

5. The multi-band radio of claim 2, wherein the receiver is in a base station in the wireless network.

6. The multi-band radio of claim 2, wherein the receiver is in a mobile station in the wireless network.

7. The multi-band radio of claim 1 further comprising:
a local oscillator operably connected to the mixer in the receiver, the local oscillator configured to provide a signal at a selected frequency to the mixer to convert an input signal frequency to an IF; and
an image filter positioned along the second path before the mixer, the image filter having a fixed cutoff frequency to support multiple bands without changing filters, and configured to filter out signals at frequencies within an image band of frequencies, wherein the image band comprises frequencies equal to a frequency of the local oscillator minus the IF, or the frequency of the local oscillator plus the IF depending on whether low-side or high-side mixing is used.

8. The multi-band radio of claim 7 further comprising:
a controller configured to identify an operating band of frequencies where the multi-band radio will send and receive signals, set the selected frequency of the local oscillator, and set the switches to route signals received to one of the first path and the second path.

9. The multi-band radio of claim 8 further comprising:
the antenna operably connected to the receiver; and
the signal processing unit operably connected to the IF filter, the signal processing unit configured to process signals having a range of frequencies within the IF band of frequencies.

10. The multi-band radio of claim 9, wherein the mixer converts the signals with the frequency greater than the IF band to an equivalent intermediate frequency within the IF band capable of being processed by the signal processing unit.

11. A multi-band radio for use in a wireless network, the multi-band radio comprising:
an antenna operably connected to a receiver and a transmitter;
a pair of switches in the receiver configured to route input signals from the antenna having a frequency within an intermediate frequency (IF) band of the receiver to an IF filter and a signal processing unit, and to route signals with a frequency greater than the IF band through an image filter and a mixer then to the IF filter and signal processing unit;
a local oscillator operably connected to the mixer in the receiver, the local oscillator configured to provide a signal at a selected frequency to the mixer in the receiver to convert an input signal frequency to an IF;
the image filter positioned before the mixer in the receiver, the image filter having a fixed cutoff frequency to support multiple bands without changing filters, and configured to filter out signals at frequencies within an image band of frequencies, wherein the image band comprises frequencies equal to a frequency of the local oscillator minus the IF, or the frequency of the local oscillator plus the IF depending on whether low-side or high-side mixing is used; and
a pair of switches in the transmitter configured to route signals from the signal processing unit to the antenna when an output signal frequency is within the IF band, and to route signals from the signal processing unit through a mixer and a sideband filter when the output signal frequency is greater than the IF band.

12. The multi-band radio of claim 11 further comprising:
a second local oscillator operably connected to the mixer in the transmitter, the local oscillator configured to provide a signal at a selected frequency to the mixer in the transmitter to convert an IF to a desired output frequency; and
an sideband filter positioned after the transmitter mixer, the sideband filter having a fixed cutoff frequency to support multiple bands without changing filters, and configured to filter out frequencies within a sideband of frequencies, wherein the sideband of frequencies comprises frequencies equal to a frequency of the local oscillator minus IF, or the frequency of the local oscillator plus the IF depending on whether low-side or high-side mixing is used.

13. The multi-band radio of claim 12 further comprising:
a feedback receiver operably connected to the transmitter;
a pair of switches in the feedback receiver, the switch in the feedback receiver configured to route input signals from the antenna having a frequency within the intermediate frequency (IF) band of the transmitter to an IF filter and the signal processing unit, and to route signals with a frequency greater than the IF band of the transmitter through an image filter and a mixer then to the IF filter and signal processing unit, wherein the second local oscillator is operably connected to the mixer in the feedback receiver and further configured to provide the signal at the selected frequency to the mixer in the feedback receiver.

14. The multi-band radio of claim 11 further comprising:
a controller configured to identify an operating band of frequencies where the transceiver will receive and transmit signals, set the selected frequency of the local oscillator, set the switches in the receiver to route signals received to one of a first receiver path and a second receiver path, and set the switches in the transmitter to route signals to be transmitted to one of a first transmit path and a second transmit path.

15. The multi-band radio of claim 11 further comprising:
a quadrature demodulator in the receiver configured to demodulate signals routed through the switches in the receiver; and
a quadrature modulator in the transmitter configured to modulate signals routed to the switches in the transmitter.

16. The multi-band radio of claim 11, wherein the local oscillator is operably connected to the mixer in the transmitter and configured to provide the signal at the selected frequency to the mixer in the transmitter.

17. A method for configuring a transceiver of a multi-band radio in a wireless network, the method comprising:
identifying an operating band of frequencies for the transceiver;
responsive to identifying that the operating band is within an intermediate frequency (IF) band of frequencies, setting a pair of receiver switches to route signals received by the transceiver on a first path directly to an IF filter and a signal processing unit;
responsive to identifying that the operating band is greater than the IF band, setting the receiver switches to route signals received by the transceiver on a second path through an image filter and a mixer then to the IF filter and signal processing unit.

18. The method of claim 17 further comprising:
responsive to identifying that the operating band is greater than the IF band, setting a pair of transmitter switches to route signals to be transmitted by the transceiver from the signal processing unit through a transmitter mixer and a sideband filter.

19. The method of claim 17 further comprising:
converting a signal to be transmitted from a signal having a frequency within the IF band of the transceiver into a signal having a frequency within the operating band; and
responsive to converting the signal to be transmitted, filtering, from the signal to be transmitted, frequencies within a sideband of frequencies, wherein the sideband of frequencies comprises frequencies equal to an absolute value of the selected frequency minus the intermediate frequency.

20. The method of claim 17 further comprising:
filtering, from the received signal, signals at frequencies within an image band of frequencies, wherein the image band comprises frequencies equal to the selected frequency minus the intermediate frequency; and
responsive to filtering the received signal, converting the received signal from a signal having a frequency within the operating band into a signal having a frequency within the IF band of the transceiver.

* * * * *